United States Patent
Bhagwat et al.

(10) Patent No.: US 10,218,804 B2
(45) Date of Patent: *Feb. 26, 2019

(54) SELECTIVE TOKEN CLASH CHECKING FOR A DATA WRITE

(71) Applicant: International Business Machines Corporation, Armonk, NY (US)

(72) Inventors: Shrirang S. Bhagwat, Pune (IN); Pankaj Deshpande, Pune (IN); Subhojit Roy, Pune (IN); Rajat Toshniwal, Badawada (IN)

(73) Assignee: International Business Machines Corporation, Armonk, NY (US)

( * ) Notice: Subject to any disclaimer, the term of this patent is extended or adjusted under 35 U.S.C. 154(b) by 78 days.

This patent is subject to a terminal disclaimer.

(21) Appl. No.: 15/086,745

(22) Filed: Mar. 31, 2016

(65) Prior Publication Data

US 2017/0289290 A1 Oct. 5, 2017

(51) Int. Cl.

| G06F 15/167 | (2006.01) |
|---|---|
| H04L 29/08 | (2006.01) |
| G06F 3/06 | (2006.01) |
| H04L 12/873 | (2013.01) |
| G06F 17/30 | (2006.01) |

(52) U.S. Cl.
CPC .......... *H04L 67/2809* (2013.01); *G06F 3/061* (2013.01); *G06F 3/065* (2013.01); *G06F 3/067* (2013.01); *G06F 3/0613* (2013.01); *G06F 3/0659* (2013.01); *G06F 17/30194* (2013.01); *H04L 47/527* (2013.01); *H04L 67/1095* (2013.01); *H04L 67/1097* (2013.01); *G06F 3/0635* (2013.01); *G06F 3/0647* (2013.01)

(58) Field of Classification Search
None
See application file for complete search history.

(56) References Cited

U.S. PATENT DOCUMENTS

| 2008/0189501 | A1* | 8/2008 | Irish | G06F 13/1631 |
| | | | | 711/167 |
| 2010/0217948 | A1* | 8/2010 | Mason | G06F 12/0866 |
| | | | | 711/171 |
| 2011/0258376 | A1* | 10/2011 | Young | G06F 12/0804 |
| | | | | 711/113 |
| 2012/0185556 | A1 | 7/2012 | Fletcher et al. | |
| 2013/0179649 | A1 | 7/2013 | Green et al. | |
| 2013/0179959 | A1 | 7/2013 | Green et al. | |
| 2014/0143286 | A1* | 5/2014 | Knight | G06F 17/30203 |
| | | | | 707/827 |

(Continued)

*Primary Examiner* — Younes Naji
(74) *Attorney, Agent, or Firm* — James L. Olsen

(57) ABSTRACT

A first request may be received to write a first set of data to a first storage device of a first storage node. The first storage device may be capable of transferring or receiving data directly to or from a second storage device without transferring the data to or from a host device mapped to the first storage node. It may be determined that a first token clash check does not need to occur for the first request. The first token clash check may include determining whether the first request is requesting to write to one or more addresses that are associated with one or more tokens owned by one or more transactions. The one or more tokens may be a proxy for a set of data within one or more particular address ranges of the first storage device.

17 Claims, 7 Drawing Sheets

(56) References Cited

U.S. PATENT DOCUMENTS

| | | |
|---|---|---|
| 2014/0181445 A1 | 6/2014 | Lam et al. |
| 2015/0052179 A1 | 2/2015 | Novick |
| 2016/0164722 A1* | 6/2016 | Zhu .................. H04L 41/082 |
| | | 709/221 |
| 2016/0205182 A1* | 7/2016 | Lazar ............... H04L 67/1095 |
| | | 709/219 |
| 2016/0252890 A1* | 9/2016 | Han ..................... G06Q 10/06 |
| | | 700/295 |
| 2017/0192889 A1* | 7/2017 | Sato ................. G06F 12/0811 |

* cited by examiner

SELECTIVE TOKEN CLASH CHECKING FOR A DATA WRITE

BACKGROUND

This disclosure relates generally to controlling a write request involving storage nodes that can directly transfer data to each other, and more specifically, to performing selective token clash checking for the data write.

Standard copy/transfer operations are characterized by reading data from a storage device and onto an associated or mapped host device such as a server, buffering the data within the host device, and then transferring/copying the data to a different location within the same or different storage device associated with the same or different host device. For example, in order to transfer a set of data from a first server to a second server, the first server may first read the set of data from an associated first disk. The set of data may then be passed from the first disk to the first server. After buffering the set of data, the first server may then transmit (e.g., via establishing a Transmission Control Protocol/Internet Protocol (TCP/IP) connection) the set of data to the second server. The second server may then write the set of data to a second disk that is associated with the second server.

Some copy/transfer operation systems are capable of transferring/receiving data directly to/from one storage node (e.g., a disk array or single disk) to another without transferring the set of data to/from any associated or mapped host devices. For example, Offload Data Transfer (ODX) is a feature in Microsoft® Windows® Server that allows data to directly be passed from one storage node to another without any data being passed to or from any associated servers. Utilizing these features, such as ODX, when compared to the standard copy/transfer operations may speed up copy/transfer operations because of reduced CPU cycles, reduced network latency, and/or reduced bandwidth consumption.

SUMMARY

One or more embodiments are directed to a computer-implemented method, a system and a computer program product for selectively performing a token clash and indicating whether a write is expected. In some embodiments, a first storage node may receive a first request to write a first set of data to a first storage device of the first storage node. The first storage device may be capable of transferring or receiving data directly to or from a second storage device without transferring the data to or from a host device mapped to the first storage node. The first storage node may determine that a first token clash check does not need to occur for the first request. The first token clash check may include determining whether the first request is requesting to write to one or more addresses that are associated with one or more tokens owned by one or more transactions. The one or more tokens may be a proxy for a set of data within one or more particular address ranges of the first storage device.

Figure 1:
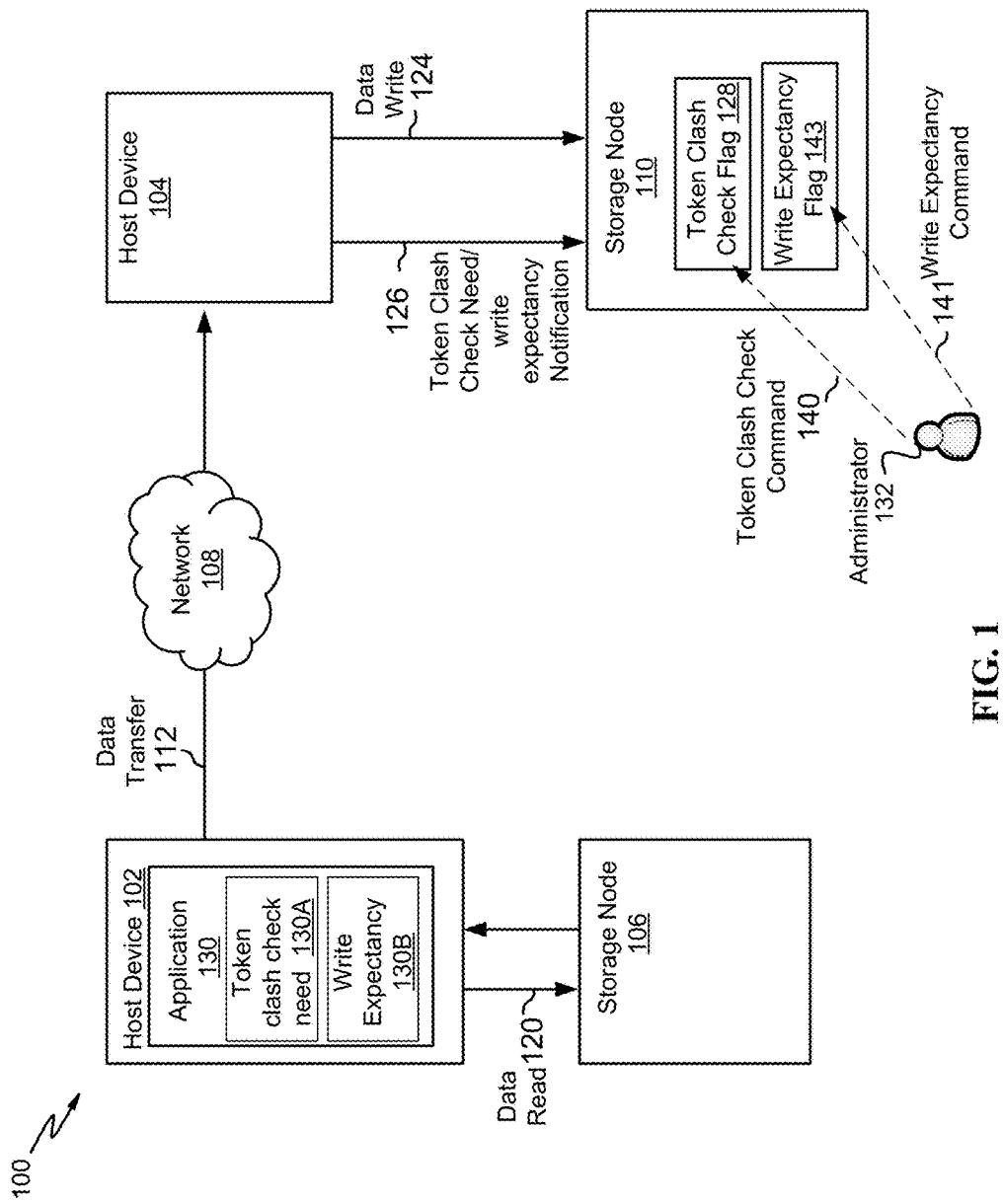
FIG. 1 is a block diagram of a computing environment that represents a first copy/transfer transaction, according to embodiments.

While the invention is amenable to various modifications and alternative forms, specifics thereof have been shown by way of example in the drawings and will be described in detail. It should be understood, however, that the intention is not to limit the invention to the particular embodiments described. On the contrary, the intention is to cover all modifications, equivalents, and alternatives falling within the spirit and scope of the invention.

DETAILED DESCRIPTION

Aspects of the present disclosure relate to performing selective token clash checking associated with data write requests in storage nodes that directly pass data to each other. While the present disclosure is not necessarily limited to such applications, various aspects of the disclosure may be appreciated through a discussion of various examples using this context.

Storage nodes may utilize token transfer in order to directly transfer data from one storage node to another without associated server involvement. A "token" may be an identification symbol that contains a set of (i.e., one or more of) values, descriptor(s), hash value(s), checksum(s), fingerprint(s), signature(s) and/or alphanumeric character(s) and that represents, corresponds to, is a proxy for, or describes a set of data within a particular address range. In some embodiments, a token may come in the form of a snapshot and/or point-in-time representation/copy of data. A token may replace a set of data during host device communication (when compared to standard copy/transfer operations) and may retain the essential information about the set of data without actually specifying what the set of data (or complete set of data) is. A token may include various fields such as metadata, the description for a set of data (e.g., a point-in-time copy of data), and a unique identifier.

In order for storage nodes to transfer data directly, a first host device may, for example, issue a request to a first storage node to generate a token representing a set of data. The first storage node may then generate the token and send the token back to the first host device. The first host device may then transmit (e.g., via TCP/IP) the token to a second host device. The second host device may then transfer the token to a mapped second storage node (e.g., via an offload write with token (WUT) operation using ODX). After the token transfer to the second host device, the set of data itself may eventually be transmitted directly from the first storage node to the second storage node to complete the WRITE operation of the data transfer.

Before an actual buffered WRITE (e.g., a standard copy/transfer SCSI WRITE) of data to a storage node occurs, token clash checks may occur for that WRITE without exception upon every request, which may be expensive. As described herein, a "token clash check" (also known as a write clash check) may be a determination of whether a first transaction is trying/requesting to write to the same address or address range/space (e.g., Logical Block Address (LBA)) that belongs/corresponds/associated to/with one or more tokens of one or more other transactions (e.g., an ODX transaction). A storage node may thus include an address or range of addresses that correspond to unique tokens, and there may be multiple requests/transactions that are occurring simultaneously (or at substantially the same time) for a given LBA range or storage device. Using the illustration above, in an ODX environment, when a Representation of Data (ROD) token command arrives at the first storage node, the token read from the first storage node will specify which LBA within the first storage node the set of data corresponding to the token will need to be read from. In order for the first storage node to correctly read the set of data from the LBA, the first storage node may without exception perform a token clash check to make sure that the ODX ROD token will not be read or interfere with a current request that is trying to WRITE to the same addresses(s) that are associated with the ODX token(s).

A particular issue is that a single transaction that utilizes data copy/transfer directly from one storage node to another may own multiple tokens. Therefore, a storage node may have to arduously check to see whether each and every token of the single transaction clashes with another transaction. If a token clash is detected for multiple tokens, each of those tokens that clash may be invalidated (i.e., removed or deleted) such that another transaction's buffered WRITE may continue to be processed. However, if and until each token for a buffered WRITE transaction is checked and then invalidated if needed, only then will that transaction proceed. This may cause unnecessary WRITE latency and CPU overhead for the standard copy/transfer transaction.

Embodiments of the present disclosure are directed to performing selective token clash checking for buffered WRITE transactions. Some applications associated with buffered WRITE transactions may need token clash checking (i.e., WRITE_CLASH_CHECK_REQUIRED) and for some applications it may be unnecessary (WRITE_CLASH_CHECK_NOT_REQUIRED). For example, some files such as databases files maintain consistency across an entire virtual disk or group of virtual disks and consequently token clash checking may not be useful. A storage device that is "consistent" as disclosed herein may refer to identical/same or analogous data from an application that is stored to two or more storage devices. The storage devices may be associated with dependent writes (e.g., a write of data on one storage device depends on a write from another storage device). In some situations, each consistent storage device ideally should be backed up/replicated/logged/restored together or at the same point in time such that there is data integrity for all of the data (e.g., all of the data is the same across all storage devices at any given time).

A "consistency group" may be a logical container (identifier) that pools multiple storage devices together so that a snapshot can be taken of all the volumes at the same point in time to maintain consistency. For example, a source database file may include a table of various records of data as viewed by a user, which is located on a first storage device. However, a second storage device may include the transaction log files (e.g., journal logs) of the same records that are located on the source database file. Further, backup files containing the same records as on the source database may be stored to a third storage device. The first, second, and third storage devices in this example may be a consistency group (and each storage device may be consistent) and a snapshot of all three storage devices may be taken at the same time to maintain consistency.

In these situations where applications are associated with consistent storage devices or groups of storage devices, any token clash checking may be unhelpful. Regardless of whether or not there is a token clash, one or more storage devices may become inconsistent. For example, a single ODX transaction may include 4 tokens corresponding to 4 LBAs, and each of the 4 tokens may be processed in order from 1 to 4. However, a standard copy/transfer WRITE (e.g., a buffered WRITE) from a second transaction may arrive at LBA 4 while token number 1 is being processed. ODX's specification may not currently allow for a storage node to identify the token package/boundaries of a particular transaction (e.g., the 4 tokens discussed above). Accordingly, even though a buffered WRITE to LBA 4 is not technically clashing with the token that belongs to LBA 1 (token 1), this situation can still lead to inconsistency because by the time the storage node processes token 4, it may offload the token with contents associated with the first transaction (the buffered WRITE) instead of contents that were in LBA 4 before the WRITE occurred. Further, even if there is a token clash, the token clash may go undetected or each token associated with a consistency group may not be invalidated.

Alternatively, for other applications such as virtual machine (VM) image store (e.g., VMware Virtual Machine File System (VMFS)), checking for token clashes for every buffered WRITE may be necessary because VM images are isolated from each other and buffered WRITEs to one VM does not have any correlation to (or maintain consistency with) WRITEs to another VM even though the VMs may be on the same virtual hard drive.

Embodiments of the present disclosure are also directed an application/host being able to communicate to a storage node concerning whether the storage node should expect to receive a buffered WRITE (i.e., OFFLD_OP_CNSIST_WRITE_EXPECTED) or not expected (i.e., OFFLD_OP_CNSIST_WRITE_NOT_EXPECTED) while VM/file level logical offload operations (e.g., ODX operations) is in progress, which may ultimately allow a storage node to determine whether a buffered write has made a logical copy inconsistent.

FIG. 1 is a block diagram of computing environment 100 that represents a transaction that includes a buffered WRITE, according to embodiments. In some embodiments, the computing environment 100 may include a host device 102 (e.g., a server computing device), a host device 104, a storage node 106 (e.g., a disk array/virtual disk) and a storage node 110, each of which are communicatively coupled via the network 108. In some embodiments, the computing environment 100 may be implemented within a cloud computing environment, or use one or more cloud computing services. Consistent with various embodiments, a cloud computing environment may include a network-based, distributed data processing system that provides one or more cloud computing services. Further, a cloud computing environment may include many computers, hundreds or thousands of them or more, disposed within one or more data centers and configured to share resources over the network 108.

In some embodiments, there may be fewer (or more) host devices than the host devices 102 and 104 within the computing environment 100. Likewise, there may be fewer or more storage nodes than the storage nodes 106 and 110 within the computing environment 100. For example, the computing environment 100 may include only one host device 102 that is responsible for issuing a transfer/copy operation from one location (e.g., a first disk) within the storage node 106 to a second location (e.g., a second disk) within the storage node 106. In some embodiments, the computing environment 100 (or 200 in FIG. 2) may also include client computers (e.g., personal computers) that communicate with one or more of the host devices (e.g., servers) 102 and/or 104 via the network 118. The client computers may correspond to users who initiate a copy/request operation (e.g., drag a file from one location to another on the client computer).

The host devices 102 and/or 104 may be any suitable computing device or machine that is associated (e.g., mapped) to the storage nodes 106 and/or 110. In some embodiments, the storage nodes 106 and/or 110 are separate computing devices that are not located within the host devices, but are remote and external to the host devices. The host devices 102 and/or 104 may be a server computing device (e.g., a blade enclosure of blade servers) or any other suitable computing device. In some embodiments, the host devices 102 and/or 104 may include one or more virtual machines (VMs) (or containers) that are a part of a copy/transfer operation (e.g., VM migration, VM cloning, Hyper-V virtual hard disk (VHDX) creation, etc.).

Figure 6:
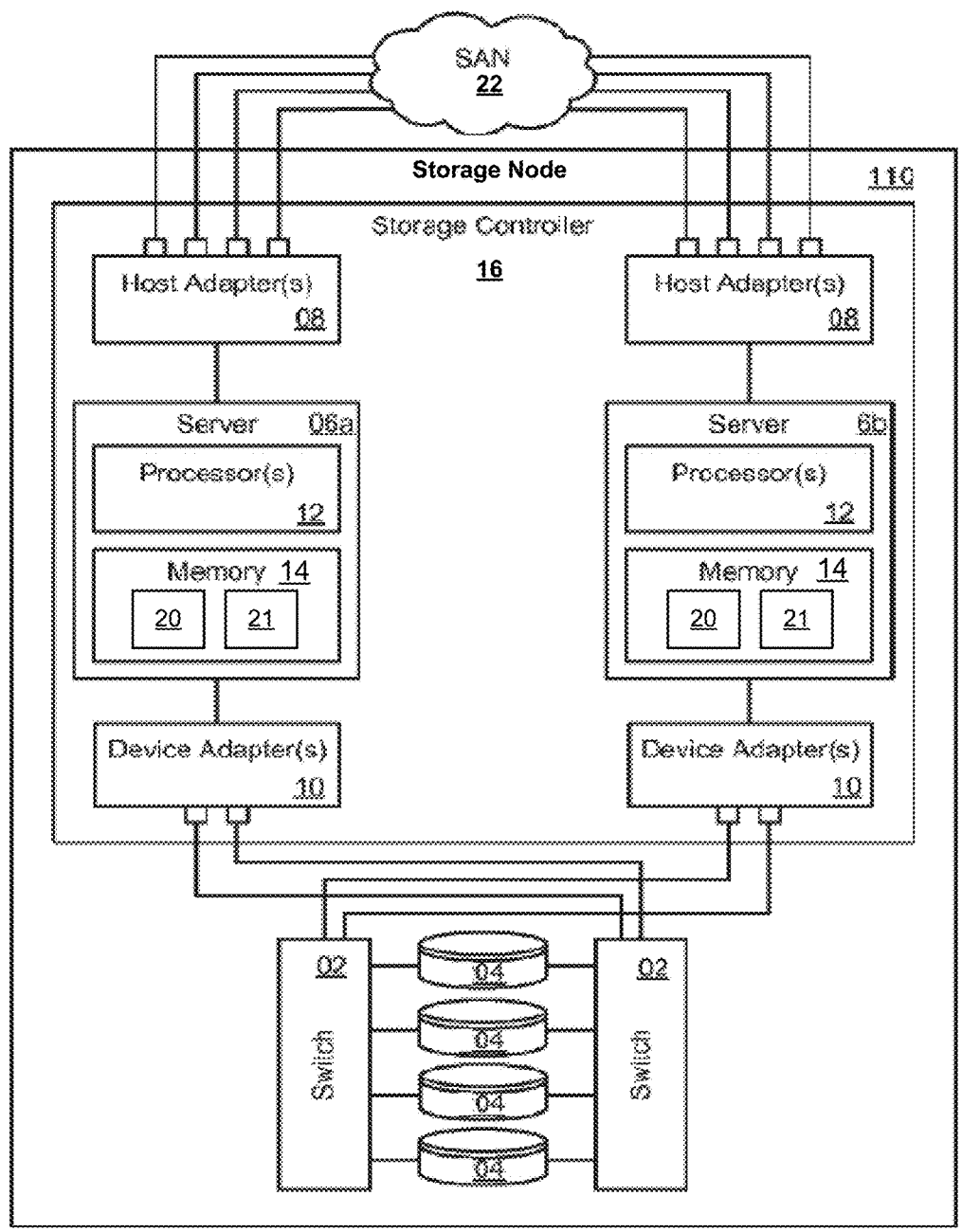
FIG. 6 illustrates an example storage node containing an array of storage devices, according to embodiments.

Consistent with some embodiments, the storage nodes 106 and/or 110 may be configured the same or analogous to the storage node 600, as illustrated in FIG. 6. In various embodiments, the storage nodes 106 and/or 110 are virtual (e.g., VMs) or physical storage apparatuses that are configured to store data associated with the host devices 102 and/or 104. For example, in various embodiments the storage nodes 106/110 (or the storage nodes 106 and 110 together) may be or include: disk arrays, virtual hard drives (VHDs), physical storage devices or volumes (e.g., disks, tapes, etc.), Server Message Block (SMB) shared disk(s), and/or a physical/virtual Logical Unit Number (LUN). A LUN may be a logical identifier representing one storage device, a group of storage devices, or a sub-unit or portion of a storage device. A "storage device" as disclosed herein may refer to a VHD, a physical storage device, a SMB disk, and/or a LUN. A LUN may be utilized as a reference identifier within a Storage-area Network (SAN) or virtual Storage-area Network (VSAN), as described in more detail below. In some embodiments, a disk array includes a computing device that contains a storage controller that manages the disk array, performs Redundant Array of Independent Disk (RAID) functions, performs snapshots, performs automated tearing, and/or thin provisioning. Disk arrays may include various shelves, each shelve including one or more storage devices.

The host device 102, the host device 104, the storage node 106, and/or the storage node 110 may communicate with another via any suitable network. For example, the network 108 may be a local area network (LAN), a general wide area network (WAN), a cellular network, and/or a public network (e.g., the Internet).

FIG. 1 represents a first copy/transfer transaction, according to embodiments. However, in some embodiments the buffered WRITE operation need not be part of a standard copy/transfer request but may be associated with any type of data request (e.g., a database request). In an example illustration, the copy/transfer of data may correspond to the importing and exporting of hyper-V VMs, live storage migration of a VM's files, creation of fixed size VHD or VHDX files, copying large databases or video files (or any portion thereof), migrating massive files, and/or backup cloning operations.

FIG. 1 illustrates particular novel features (e.g., the application 130/token clash check flag 128) that are associated with a transaction that utilizes buffered WRITEs. In some embodiments, the application 130 may be an application located on a client computer as opposed to or in addition to the host device 102 and therefore a client application may be responsible for determining whether a token clash check needs to occur. The application 130 in some embodiments may request a data transfer/copy of data. In some embodiments, the application 130 includes a token clash need indicator 130A, which may be a tag/code that specifies to one or more host devices and/or storage nodes whether the application 130 needs a token clash check. The storage node 110 may thus receive information from the application 130 associated with a request indicating whether a token clash check needs to occur. The application may further include a write expectancy 130B indicator, which may be a tag/code that specifies to one or more host devices and/or storage nodes whether the application 130 is configured to receive a buffered write while a VM/file level logical offload operation is in progress.

In some embodiments, the host device 102 may first perform a data read 129 of data from the storage node 106 into a buffer of the host device 102. The host device 102 may then transmit the data (data transfer 112) (e.g., via establishing a Transmission Control Protocol/Internet Protocol (TCP/IP) connection) to the host device 104 and the host device 104 may buffer the data upon receiving the data. In some embodiments, the data transfer 112 may include the information specified by the token clash need indicator 130A/write expectancy indicator 130B to notify the host device 104 whether or not a token clash check needs to occur or a write is expected. In alternative embodiments, the information specified by the token clash need indicator 130A/write expectancy indicator 130B may be sent as a separate or out of band notification to the host device 104 instead of being sent with the data transfer 112.

In some embodiments, the host device 104 (and/or host device 102) may include a list of token clash check applications (i.e., a list of applications and/or application types that need to have a token clash check operation performed). In these embodiments, the data involved in the data transfer 112 may include an identifier (e.g., value(s), ID(s), signatures, etc.) that indicates the identity and/or the classification/category/type of application that the application 130 or client application is in. The identifier may then be compared against the list of token clash check applications. For example, the application 130 may be associated with a database file and have a corresponding identifier of 1. The data transfer 112 may pass the identifier to the host device 104. The host device 104 may then determine that the identifier of 1 is not within the list of token clash check applications and thus determine that no token clash check is needed.

In some embodiments, the host 104 may then issue a token clash check need/write expectancy notification 126 to the storage node 110. The token clash need/write expectancy notification 126 may be a message/command (e.g., a special Small Computer System Interface (SCSI) command) that communicates to the storage node 110 indicating whether a token clash check is needed or not (e.g., based on the token clash need indicator 130A or based on the classification/ID of the application and the list of token clash check applications). Alternatively, the notification 126 may be a message/command that communicates to the storage node 110 indicating whether a write is expected or not (e.g., based on the write expectancy indicator 130B). In some embodiments, the host 104 may issue the token clash check need/write expectancy notification 126 as part of the data write 124 (e.g., a standard copy/transfer buffered WRITE). In some embodiments, the token clash check need/write expectancy notification 126 may be sent prior to or at the beginning of a copy/transfer operation request, such that the application 130 communicates to the host device 104 and/or the storage node 110 indicating whether a token clash check needs to occur/write is expected. In some embodiments, after the token clash check need/write expectancy notification 126 is sent, the host device 106 may perform the data write 124 in order to WRITE the data to the storage node 110.

In embodiments, the storage node 110 includes a token clash check flag 128 and a write expectancy flag 143. The token clash check flag 128 may correspond to a bit or plurality of bits, which represent whether a token clash check is needed (e.g., "true," "on," value of "1") (i.e., WRITE_CLASH_CHECK_REQUIRED) or whether a token clash check is not needed (e.g., "false," "off," value of "0") (WRITE_CLASH_CHECK_NOT_REQUIRED) for a particular transaction (e.g., application 130). For example, the storage node 110 may receive the token clash check need notification 126, which indicates that a token clash check may not need to occur. A storage controller may then set the token clash check flag 128 to a value (e.g., 0) indicating that the token clash check is not needed such that the storage node 110 will not perform a token clash check. Moreover, the write expectancy flag 143 may correspond to a bit or plurality of bits, which represent whether a write is expected (i.e., OFFLD_OP_CNSIST_WRITE_EXPECTED) or not expected (i.e., OFFLD_OP_CNSIST_WRITE_NOT_EXPECTED) for a particular transaction In some embodiments, the token clash check flag 128 may be set as not needed if the application 130 is associated with data that is consistent or part of a consistency group. In some embodiments, the application 130 may be of a particular application type/class (e.g., database application) that is consistent and therefore always indicates to the storage node 110 (via the token clash check need indicator 130A) that it does not need to perform a token clash check. In some embodiments, however, the application 130 may not necessarily have information that the storage device that its corresponding data is stored on is consistent or part of a consistency group. Accordingly, in some embodiments, the application 130 may query the storage node 110 (or 106) or other component to determine whether the data for the application 130 is consistent or part of a consistency group.

FIG. 1 also illustrates that an administrator 132 may be the entity responsible for determining whether a token clash check is needed or whether a write is expected, as opposed to or in addition to a host device (e.g., via the token clash check need indicator 130A or the write expectancy indicator 130B). For example, before a client application issues a copy/transfer request, the administrator 132 may (via a computing device) indicate whether a token clash check is needed, according to various embodiments. In some embodiments, the administrator 132 sends a token clash need command 140 (e.g., a Command Line Interface (CLI) command), which is a special command to deactivate or turn off (or turn on) the token clash checking (e.g., the token clash check flag 128) function for a storage device or group of storage devices. For example, the storage node 110 may be configured by default to perform a token clash check for every copy/transfer operation. However, when the administrator 132 sends the token clash need command 240, the automated token clash check may be deactivated or turned off. Likewise, the administrator 132 may send a write expectancy command 141 to indicate whether a write is expected (i.e., /not expected (via the write expectancy flag 143).

In some embodiments, the administrator 132 may utilize an out of band token clash need request in order to deactivate (or activate) a token clash check function (e.g., turn a token clash check flag 228 on or off) or write expectancy. For example, the administrator 132 may select a control button on a user interface such that the storage node turns the token clash check flag 228 on/off.

In some embodiments, the administrator 132 (or host device(s)) may determine whether a copy/transfer request needs a token clash check based at least on whether the data associated with the request is stored to storage devices that are consistent. For example, the administrator 132 may mark the storage node 110 as consistent by specifying that a virtual disk or consistency group is "consistent across entire address space," suggesting that other storage nodes include associated data (e.g., the storage node 210 is a part of a first container of volumes associated with a first consistency group).

Figure 2:
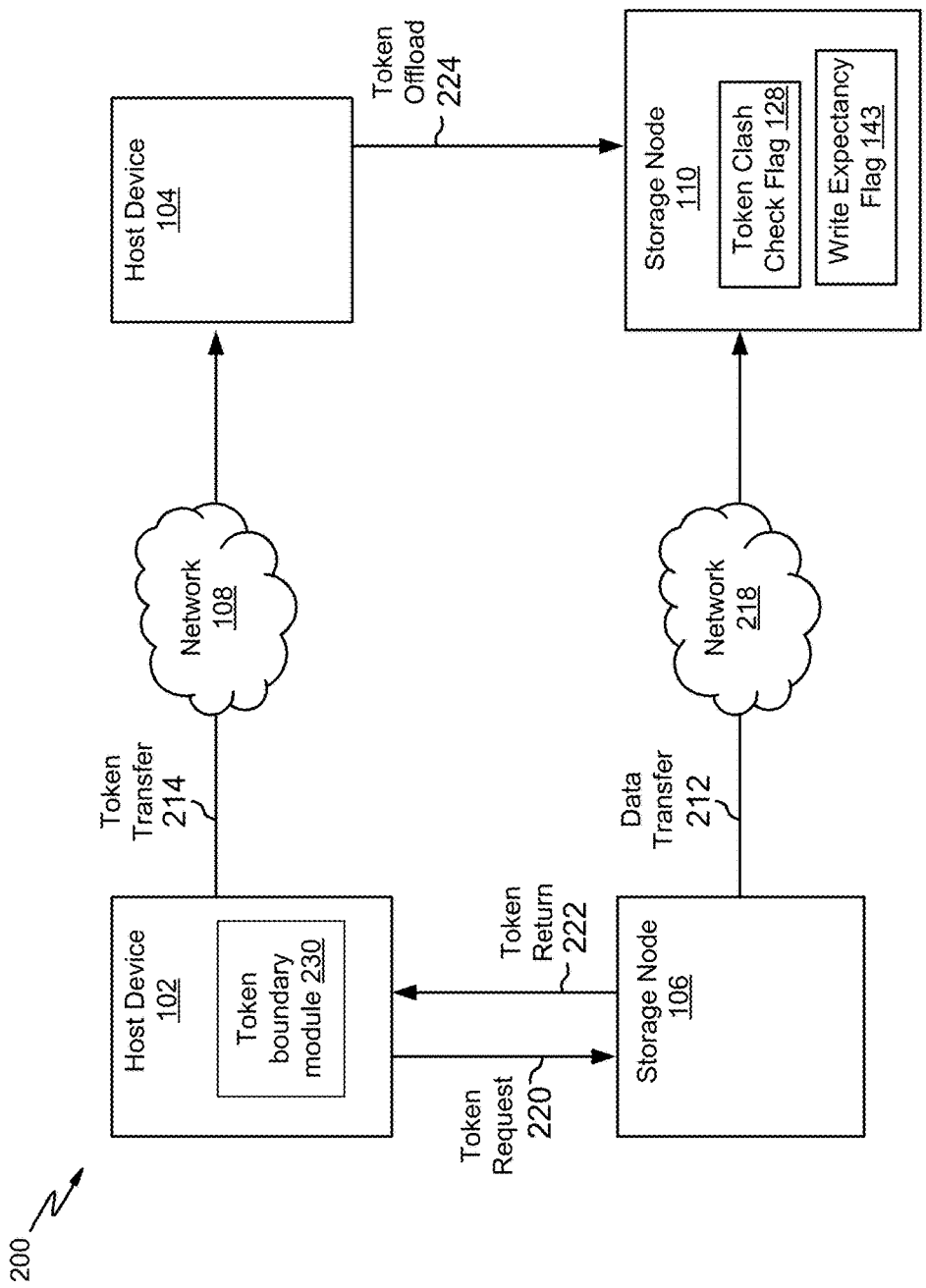
FIG. 2 is a block diagram of a computing environment that represents a second copy/transfer transaction, according to embodiments.

FIG. 2 is a block diagram of computing environment 200 that represents a second transaction, according to embodiments. In some embodiments, the computing environment 200 may be a part of the computing environment 100. FIG. 2 illustrates that the second copy/transfer transaction (e.g., and ODX transaction) directly transfers data from the storage node 106 to the storage node 110 via the network 218. The network 218 may also be any suitable network. For example the network 218 may be a SAN or VSAN network. A SAN (VSAN) network is a network dedicated to providing block-level storage and interconnecting various storage nodes or allowing storage nodes to communicate with each other. In some embodiments, storage nodes within a SAN may not be able to be accessed via other networks (e.g., the network 108). A SAN may be a high speed connection and allow any-to-any connection across the network 218 by using interconnect elements, such as switches and directors. A SAN may also eliminate any restriction to the amount of data that a host device can access. Traditionally, for example, a server may be limited by the quantity of storage devices that attach to the individual server. Instead, SAN introduces the flexibility of networking to enable one server (or many servers) to share a common storage utility. In some embodiments, the host devices 102 and/or 104 may communicate with the storage nodes 106 and/or 110 via a SAN.

FIG. 2 may represent a second copy/transfer transaction that is contemporaneous in time and storage location with the first transaction specified in FIG. 1. The copy/transfer of data in FIG. 2 may correspond to the importing and exporting of hyper-V VMs, live storage migration of a VM's files, creation of fixed size VHD or VHDX files, copying large databases or video files (or any portion thereof), migrating massive files, and/or backup cloning operations. In some embodiments, FIG. 1 illustrates an ODX data copy/transfer operation, according to various embodiments.

In some embodiments, for this second transaction, the host device 102 may first perform a token request 220 (e.g., an offload read or Populate Token (PT) command in ODX) in order to retrieve token(s) associated with a particular address or range of addresses (e.g., an LBA). The host device 102 may then fetch the token(s) (token return 222) (e.g., by issuing a Receive Rod Token Information (RRTI) command in ODX) from the storage node 106. A token transfer 214 of the token(s) may then be performed from the host 102 to the host 104 via the network 108. Accordingly, the host 102 may pass the token(s) to the host 104. The host device 104 may then perform an offload token 124 operation (e.g., via a Write Using Token (WUT) command) in order to pass the token(s) to the storage node 110 and specify what storage address range (e.g., LBA) the token(s) corresponds to in order to perform the data transfer 212 to the correct location. In some embodiments, and as described in more detail below, host devices/client devices (e.g., via the token boundary module 230) may be configured to identify (e.g., upon receiving a request) each token of a plurality of tokens that are associated with a request/transaction. Accordingly, the client/host devices may specify when a logical offload operation corresponding to multiple tokens starts and ends (i.e., the token boundaries for the second transaction). In some embodiments, after the token offload 224, the storage node 106 may then perform a data transfer 212 directly to the storage node 110's appropriate address (e.g., LBA range).

Token clash modes, as illustrated above, may be supported as follows: WRITE_CLASH_CHECK_REQUIRED and WRITE_CLASH_CHECK_NOTE_REQUIRED. An application/administrator may require write clash checking when a normal write is received on a storage device. In some embodiments, this is the default mode, as illustrated below. Some applications/administrator may not require token clash processing when a normal write is received on the storage device. Accordingly, the storage node may skip processing to perform token clash processing for particular transaction.

Moreover, offload operation consistency modes for indicating whether a write is expected for a transaction may be as follows: OFFLD_OP_CNSIST_WRITE_NOT_EXPECTED and OFFLD_OP_CNSIST_WRITE_EXPECTED. In some embodiments, an application/administrator may set the mode as "not expected" before starting a logical offload operation START (e.g. before starting an ODX operation PT request) and then reset this mode (e.g., to "expected") at the end of the same offload operation END. The initial setting of the mode (to "not expected") and then the resetting (to "expected") at the START and END allows the host/administrator to communicate the token boundaries of a VM/file level offload operation (e.g., an ODX operation) of a particular transaction, as discussed in more detail below.

In some embodiments, the "expected" mode may be a default mode and so if an application does not set any offload consistency mode, then a write is always expected.

The different scenarios regarding whether a write is expected/not expected and whether token clash checking is needed/not needed, along with default scenarios, are illustrated in the tables below, according to particular embodiments. A "normal read/write" may refer to a buffered/standard read/write and an "offload read/write" may refer to an operation of a transaction that directly transfers/copies directly from one storage node/device to another without server involvement (e.g., ODX transactions).

The table below illustrates particular hypotheticals and how a particular token clash check mode may be set accordingly:

| hypothetical | token clash mode |
|---|---|
| default: (no application/administrator set a particular mode for a particular consistency group/storage device) | WRITE_CLASH_CHECK_REQUIRED |
| Some applications/administrator express token clash needed, some express token clash not needed for the same consistency group/storage device | WRITE_CLASH_CHECK_REQUIRED |
| All applications/administrator have expressed that token clash check is not required | WRITE_CLASH_CHECK_NOT-REQUIRED |

The table below illustrates particular hypotheticals and how a particular write expectancy mode may be set accordingly:

| hypothetical | write expectancy mode |
|---|---|
| default: (no application/administrator set a particular mode for a particular group/storage device) | OFFLD_OP_CNSIST_WRITE_EXPECTED |
| Some applications/administrator express that a write is expected, some express that a write is not expected for the same consistency group/storage device | OFFLD_OP_CNSIST_MISCNFG. Misconfiguration means that all offloaded operations (e.g., ODX) will be failed |
| All applications/administrator have expressed that a write is not expected | OFFLD_OP_CNSIST_WRITE_NOT_EXPECTED |

The table below illustrates storage node behavior depending on whether a token clash check is needed or not needed:

| token clash check mode | application request | Storage node behavior |
|---|---|---|
| WRITE_CLASH_CHECK_REQUIRED | offload read, offload writes | Allow |

-continued

| token clash check mode | application request | Storage node behavior |
|---|---|---|
| WRITE_CLASH_CHECK_REQUIRED | Normal read | Allow |
| WRITE_CLASH_CHECK_REQUIRED | Normal writes | Allow and process the writes with the help of token clash check scheme |
| WRITE_CLASH_CHECK_NOT_REQUIRED | offload read, offload writes | Allow |
| WRITE_CLASH_CHECK_REQUIRED | Normal read | Allow |
| WRITE_CLASH_CHECK_REQUIRED | Normal writes | Allow without any token clash checking |

The table below illustrates storage node behavior depending on whether a write is expected or not expected:

| write expectancy mode | application request | Storage node behavior |
|---|---|---|
| OFFLD_OP_CNSIST_WRITE_NOT_EXPECTED | offload read, offload writes (e.g., ODX) | Allow until node receives a buffered WRITE, then fail offload request until this flag is cleared by the application (END) Offload I/O may start only after setting this mode using a command (START) |
| OFFLD_OP_CNSIST_WRITE_NOT_EXPECTED | Normal Read | Allow |
| OFFLD_OP_CNSIST_WRITE_NOT_EXPECTED | Normal Write | Allow. Fail existing offload (e.g., ODX) requests and future offload requests until the "write not expected" is cleared |
| OFFLD_OP_CNSIST_WRITE_EXPECTED | Offload read, offload writes | Allow |
| OFFLD_OP_CNSIST_WRITE_EXPECTED | Normal read | Allow |
| OFFLD_OP_CNSIST_WRITE_EXPECTED | Normal Write | Allow and process as per token clash mode |
| OFFLD_OP_CNSIST_MISCNFG | Offload read, offload writes | Fail all offload I/Os |
| OFFLD_OP_CNSIST_MISCNFG | Normal read | Allow |
| OFFLD_OP_CNSIST_MISCNFG | Normal write | Allow |

Figure 3:
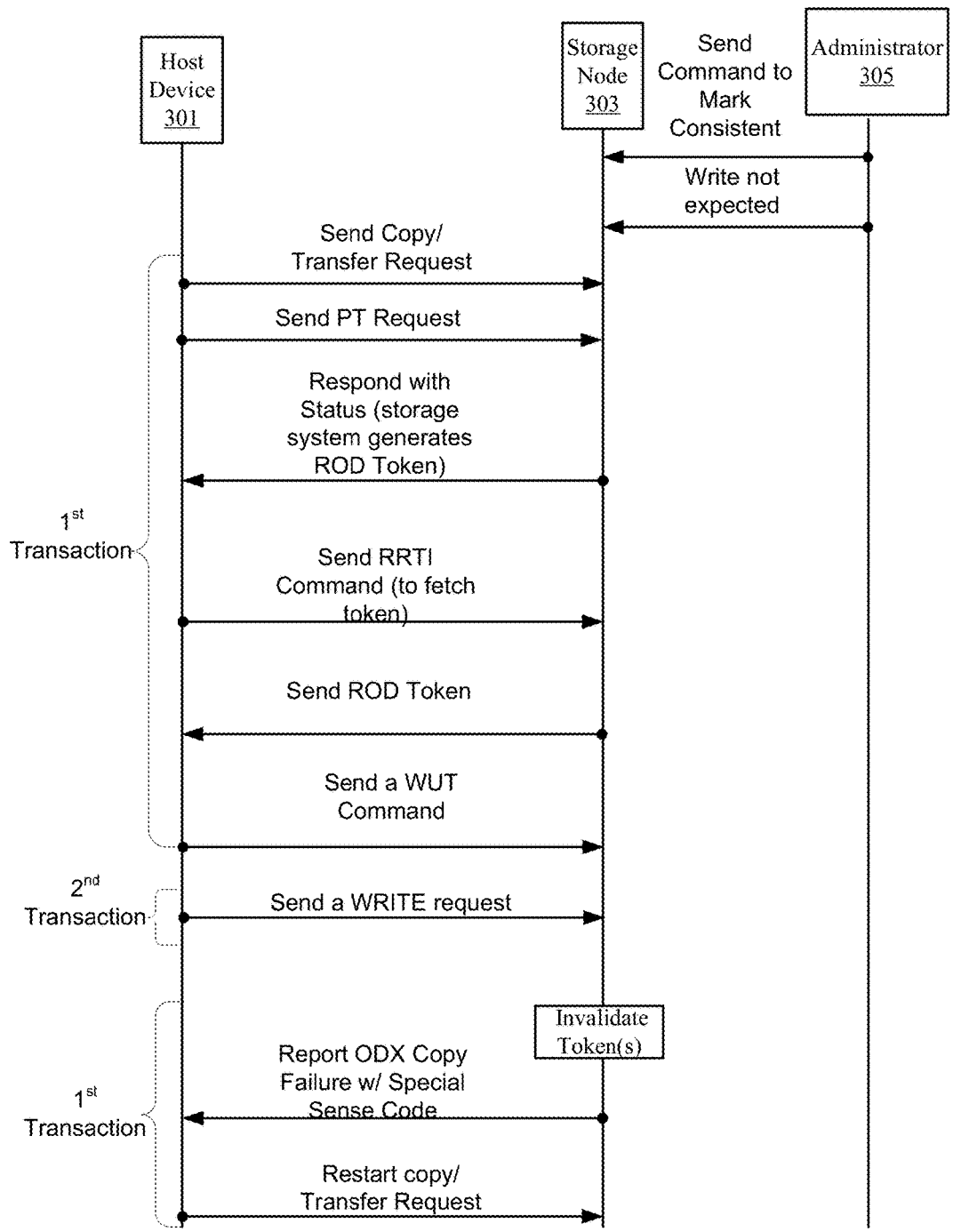
FIG. 3 is an interaction diagram illustrating what happens to an ODX transaction where token clash checking is not performed and the ODX transaction is not expecting a write from another transaction but receives a write, according to embodiments.

FIG. 3 is an interaction diagram illustrating what happens to an ODX transaction where token clash checking is not performed (not required) and the ODX transaction is not expecting a write from another transaction but receives a write, according to embodiments. In some embodiments, the ODX operation in FIG. 3 may correspond to any of the other transfer/copy operations as specified in FIGS. 1, 2, 4, 5, and 6. FIG. 3 includes actions performed by the administrator 305, the storage node 303, and the host device 301. In some embodiments, the Administrator 305 may first send a command (e.g., the token clash check need command 140 of FIG. 1) to mark the storage node 303 (or associated storage devices) as consistent, which may indicate that the storage node 303 does not need to perform a token clash check for copy/transfer requests that have data within the storage node 303. The administrator 305 may then send a second command (e.g., the write expectancy command 141 of FIG. 1) to mark the storage node 303, which may indicate that the ODX transaction is not expecting another transaction WRITE to occur.

The host device 301 may then send a copy/transfer request for a first transaction (e.g., an ODX transaction as specified in FIG. 2). This request may be preceded by a client device requesting to copy/transfer data by dragging/moving/copying a file from one location using—using a user interface/command line—to another location. The host device 301 may then receive this request and send a second copy/transfer request (which is as associated with or part of the client device request) to the storage node 303.

The host device 301 may then send a PT request to the storage node 303 to create a token for the first transaction. The PT request may include the source storage node (the storage node that data is being copied from) LBA details associated with the copy/transfer request so that the storage node 303 knows what LBA range to create a token for. The storage node 303 may then generate a ROD token and respond back to the host device 301 with status indicating that the storage node 303 has (or has not) completed generation of the ROD token. The host device 301 may then send an RRTI command to fetch the ROD token from the storage node 303 for the first transaction. The storage node 303 may then send the ROD token to the host device 301. If more host devices are a part of the copy/transfer request (e.g., host device 102 and 104 of FIG. 1), then the token may be transferred/copied from the host device 301 to another host device.

The host device 301 (or second host device) may then send a WUT command to the storage node 303 (or second storage node) to send the token to the storage node 303 (or second storage node) for the first transaction. The WUT command may include a target LBA range (i.e., a portion of the address range to which data will be transferred/copied to) so that the storage node 303 (or second storage node) knows what LBA the token corresponds to (or what LBA the data needs to be transferred/copied to).

At this point, in some embodiments, for a second transaction (e.g., a standard copy/transfer transaction specified in FIG. 1), the host device 301 may send the storage node 303 a WRITE request (e.g., that is proceeded by the data write 124 of FIG. 1). The storage node 303 (or second storage node) may then invalidate each and all of the tokens associated with the storage node 303 that are part of the first transaction, as described in more detail below. For example, the storage node 303 may include a virtual disk. The virtual disk may include 4 LBA ranges corresponding to 4 tokens. Each and every one of the 4 tokens may be invalidated for the first transaction, as opposed to checking every one of the 4 tokens to determine whether there is a token clash, which may be expensive as described above.

The Storage node 303 may then report to the host device 301 of an ODX transfer/copy failure/termination and pass along a special sense code, which notifies the host device 301 (and/or associated client device) to re-start the transfer/copy operation for the first transaction. The host device 301 may then restart the transfer/copy operation for the first transaction, which is described in more detail below.

Figure 4:
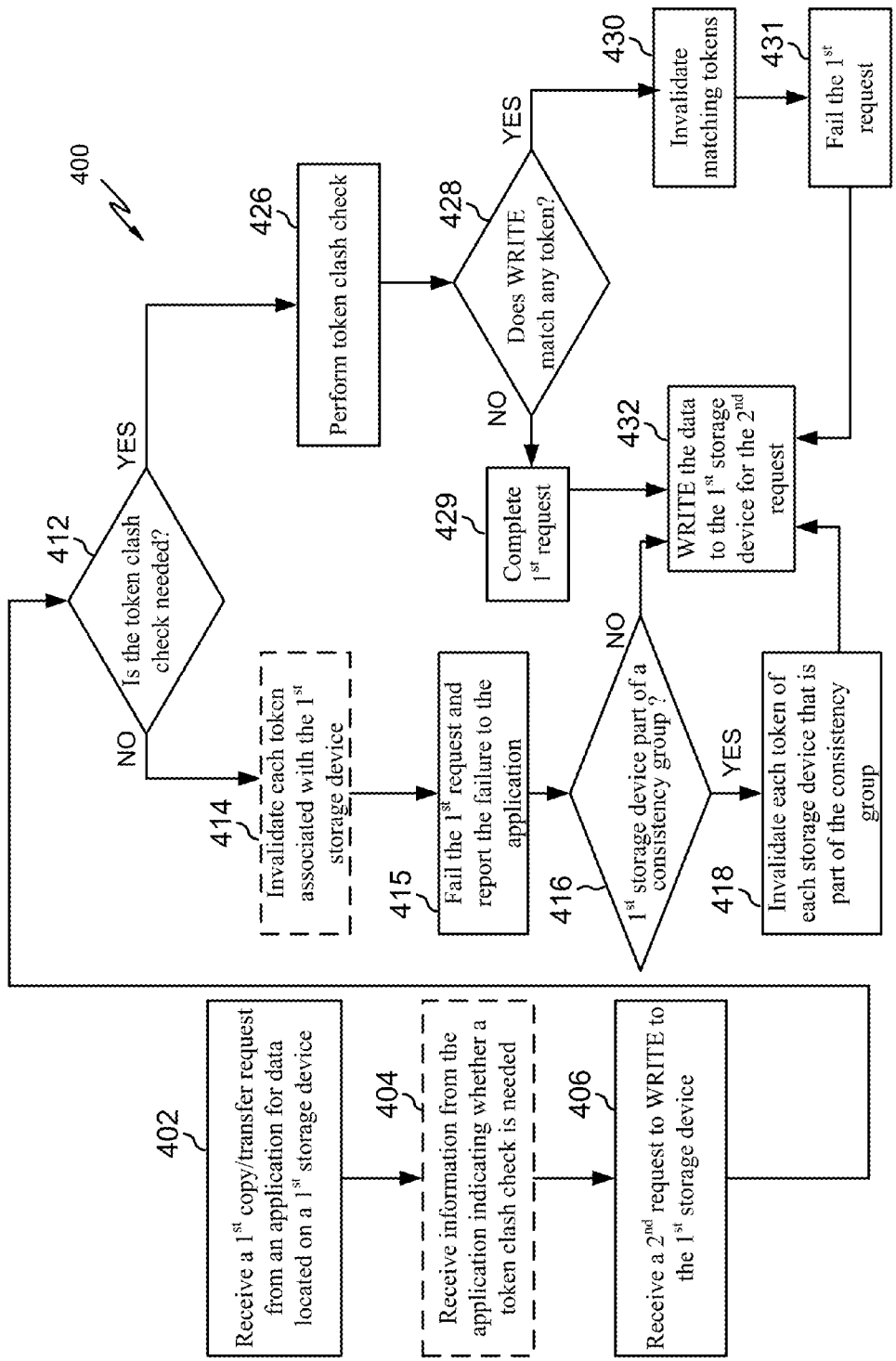
FIG. 4 is a flow diagram of an example process for performing selective token clash checking, according to embodiments.

FIG. 4 is a flow diagram of an example process for performing selective token clash checking, according to embodiments. In some embodiments, the process 400 may begin at block 402 when a first copy/transfer request (e.g., an ODX request) is received (e.g., by a storage node/host device) from an application for data that is located on a first storage device. The first request may correspond to a first transaction or client. Per block 404, and in some embodiments, information may be received from the application (e.g., via the token clash check need indicator 130A of FIG. 1) indicating whether a token clash check is needed. In some embodiments, however, an administrator (e.g., the administrator 132 of FIG. 1) may send a command/request to the storage node indicating whether the storage node needs (or does not need) to perform a token clash check. In some embodiments, the need to perform a token clash check may be based on whether the first storage device is consistent or part of a consistency group, as described above. In some embodiments, information indicating whether a write is expected/not expected is also received at block 404 (i.e., OFFLD_OP_CNSIST_WRITE_NOT_EXPECTED or OFFLD_OP_CNSIST_WRITE_EXPECTED).

Per block 406, a second request may be received to WRITE (e.g., a buffered WRITE 6 or WRITE 10) data to the first storage device. The second request may correspond to a second transaction or client. The second request may be or include various types data requests such as but not limited to: a standard copy/transfer request, a database transaction UPDATE, INSERT, operation, etc.

Per block 412, it may be determined (e.g., by a storage array that includes the first storage device or other component) whether a token clash check is needed. For example, if the commands OFFLD_OP_CNSIST_WRITE_NOT_EXPECTED and WRITE_CLASH_CHECK_NOT_REQUIRED is received by a storage node, then the decision at block 412 may be "No" and block 414 may occur. Alternatively, if the commands OFFLD_OP_CNSIST_WRITE_EXPEXTED and WRITE_CLASH_CHECK_REQUIRED is received by the storage node, the decision at block 412 may be "Yes," and block 426 may occur.

In another illustrative example, the information as specified in block 404 may be transmitted to/assessed by the component that makes the decision at block 412. In some embodiments, in response to the determination of yes/no at block 412 a token check flag (e.g., the token clash check flags 128/228 of FIG. 1 or 2) may be set. Per block 414, if a token clash check is not needed (e.g., because the first storage device is marked as consistent), then each of the tokens of the first storage device may be invalidated (e.g., by a storage array that includes the first storage device). For example, a storage node may include the first storage device and the first storage device may be broken up into 8 LBAs. If the first copy/transfer request received in block 402 owned a token that the second request will write to, then each of the 8 tokens corresponding to the first request and first storage device may be invalidated. In alternative embodiments, only the particular tokens of the 8 tokens that the first request owns may be invalidated, as opposed to invalidating all 8 tokens corresponding to the entire first storage device. As disclosed herein, to "invalidate" a token may mean to delete particular token(s) associated with particular requests/transactions.

Per block 415, the first request may be failed (e.g., cancelled/blocked/terminated) (e.g., by a storage array) and the failure may be reported to the application/client/host (e.g., the reporting of the ODX copy failure as specified in FIG. 3). Accordingly, invalidating may also correspond to or be associated with failing requests/transactions that own tokens (e.g., ODX requests) such that the failed requests have to start over again or initiate a new session.

Per block 416, it may be determined (e.g., by an administrator/storage array) whether the first storage device in which some or all of the tokens were invalidated is a part of a consistency group. For example, an administrator may mark the first storage device of a storage array as consistent (as shown in FIG. 3) and specify what consistency group the first storage device is a part of. For example, the first storage device may be a storage device within a container along with other storage devices with an ID of X. The administrator may then specify this ID to the storage node/array so that the storage node has knowledge of which other storage node's tokens need to be invalidated. In other embodiments, a host device (or other component) may query the storage node, as described above, to determine whether or not a storage device is a part of a consistency group. In these embodiments, the storage node may not necessarily need an administrator issuing a command/request to pass along consistency information as the storage node may already store this information.

Per block 418, if the first storage device is a part of a consistency group, each and every (or some) of the storage device's tokens that are part of the consistency group may be invalidated. For example, a storage controller or other component of a first storage node may first invalidate each of the first request's tokens on the first storage device. The storage controller may then communicate, via a SAN, with another second storage node to invalidate (e.g., by a second storage controller) each token of a second storage device that belongs to a consistency group and transaction. Invalidating each token corresponding to each consistency group may help maintain WRITE consistency for the consistency group. Per block 432, the WRITE of the data of the second request to the first storage device may occur (e.g., by a storage array) (e.g., the data write 124 to the storage node 110 of FIG. 1).

Per block 426, if a token clash check is needed, a token clash check may be performed (e.g., by a storage array). For example, a VM migration may need to occur and accordingly, it may be determined (block 412) that a token clash check needs to occur for the VM migration. A token clash check may be performed in any suitable manner. For example, a data structure, such as a segment tree, may store tokens associated with each storage device and may specify which LBA region a particular token belongs to. A component (e.g., a storage controller) may then query the segment tree to determine, per block 428, whether the WRITE of the second request for a particular LBA range matches any other token (e.g., a token that belongs to or is associated with the same LBA range/space that the first request is associated with). Per block 430, if the WRITE matches any token owned by the first request, then each of the tokens that match may be invalidated. Per block 431, the first request may then be failed and then the WRITE of the data may proceed per block 432. Per block 429, if the WRITE of the second request does not match any tokens of the first request, then the first request may completed and also the second request may be completed per block 432.

Figure 5:
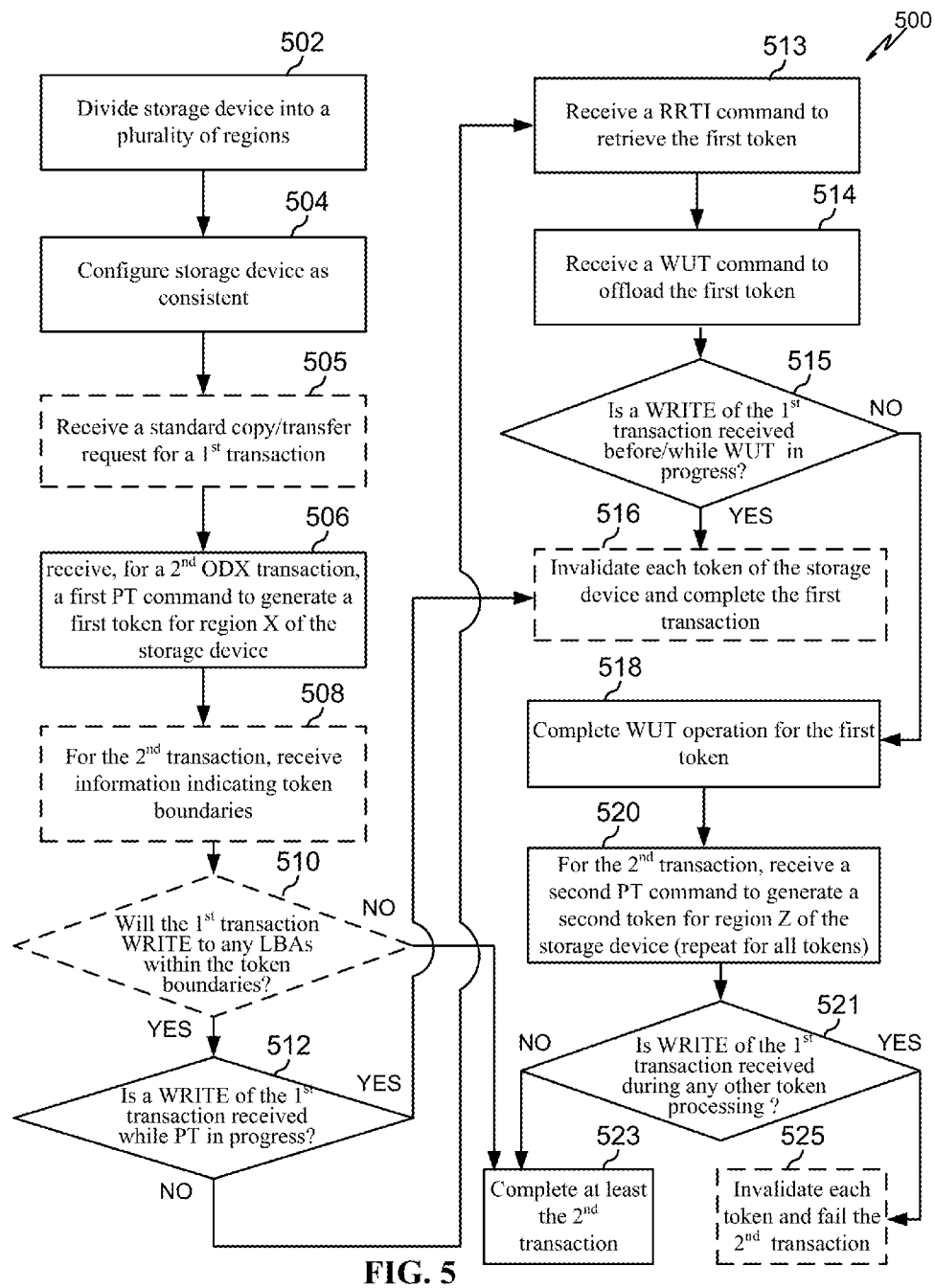
FIG. 5 is flow diagram of an example process for performing an ODX copy/transfer transaction and another transaction where a write is not expected and token clash checking is not performed, according to embodiments.

FIG. 5 is flow diagram of an example process 500 for performing an ODX copy/transfer transaction and another transaction where a write is not expected and token clash checking is not performed (required), according to embodiments. FIG. 5 is based on the principle that consistency may be maintained for a storage device where two or more transactions substantially simultaneously access data from the same storage device. A "transaction" may be multiple functions (e.g., PT, RRTI, WUT, WRITE, etc.) that make up a particular unit of work. Each transaction may be associated with a unique user/client computer or different copy/transfer operations by the same user. In some embodiments, the process 500 may not necessarily reflect ODX copy/transfer transactions, but other copy/transfer transactions. In some embodiments the process 500 may be included in the process 400 of FIG. 4 and/or vice versa.

In some embodiments, the process 500 begins at block 502 when a storage device is divided into a plurality of regions (e.g., LBAs). For example, the volume may be divided into the LBAs of X, Y, Z, and T. Each region may also be associated with a particular token. For example, a first token may include a first snapshot copy of data that is within region X. A second token may include a second snapshot copy of data that is within region Y. A third token may include a third snapshot copy of data that is within region Z. A fourth token may include a fourth snapshot copy of data within region T.

Per block 504, the volume may be configured as consistent. For example, an application (e.g., application 130 of FIG. 1) may send a write clash check need notification to the storage node that includes the storage device in order to mark the storage device as consistent, which may indicate that a write clash check is not needed. In another example, an administrator (e.g., administrator 132 of FIG. 1) may send a token clash check need command to mark the volume as consistent to indicate that a write clash check is not needed.

Per block 505, a standard copy/transfer request may be received that corresponds to a first transaction. In some embodiments, the first transaction is not necessarily a standard copy/transfer transaction, but may include a database transaction request, or any other type of transaction where a WRITE of data will occur to the storage device.

Per block 506, for a second ODX transaction, a first PT command (as part of an ODX copy/transfer request) may be received (e.g., by the storage node) in order to generate a first token for region X on the storage device. Per block 508, for the second transaction, information may be received (e.g., by a storage node) indicating the token boundaries of a first copy/transfer request (e.g., via the token boundary module 230 of FIG. 2). When a particular ODX copy/transfer request occurs, multiple tokens may be processed in particular increments as long as the data that needs to be copied/transferred is larger than the particular increments. For example, if a token is processed in 1 GB increments but a request is made for a 10.5 GB contiguous file, a total of 11 tokens may be sent to the storage node to be processed. Put another way, the second transaction may need data from regions X, Y, and Z. Accordingly, the token boundaries or the quantity of tokens needed is 3 tokens that correspond to regions X, Y, and Z. Further, tokens for PT (or WUT) requests, may be sent/processed sequentially. Therefore, there may be multiple PT (or WUT) requests for a given transaction and a currently processed token, in some cases, must complete before another token for a same transaction is processed. Defining the token boundaries may be useful in order to specify to the storage node to fail/complete a copy/transfer request associated with any region within the same boundaries, as discussed in more detail below. In some embodiments, however, receiving information about token boundaries may not occur, as it may not matter what tokens the second transaction is associated with as any second transaction that will WRITE to the storage device may cause each and every one of the second transaction's tokens to be invalidated (block 516).

Per block 510, it may be determined (e.g., by a storage node) whether the first transaction will WRITE to any LBAs within the token boundaries (i.e., whether the first transaction will write to any LBA associated with the second transaction). The determination may be based on the receiving information from the second transaction that indicates the second transaction's token boundaries. Accordingly, it may be determined whether any token owned by the second transaction matches the WRITE of the first transaction. However, in some embodiments, block 510 may not occur and the process 500 may continue from block 506 to block 512. Therefore, each of the second transaction's tokens (or each token associated with the entire storage device) may be invalidated (block 516) after determining that the first transaction is trying to write to the same storage device as the second transaction. This may be regardless of the token boundaries of the second transaction. In some embodiments, per block 523, if the first transaction will not write to any token regions within the token boundaries of the second transaction, the second transaction may complete (i.e., each token of the second transaction may be processed and the second transaction may complete). And the first transaction may also be completed as a part of block 523 if the first transaction will not write to any of the LBAs within the token boundaries.

Per block 512, it may be determined (e.g., via a storage node) whether a WRITE request of the second transaction is received during the PT processing (e.g., any time after the PT command in block 506 (e.g., the PT request 220 of FIG. 1) until the actual offload read of the first token (e.g., token return 222 of FIG. 2)). The WRITE of the first transaction may correspond to the WRITE request of the data from one host device to a storage node. For example, referring back to FIG. 1, block 512 may correspond to determining whether the storage node 110 has received a request from the host device 104 to receive the data write 124 during the PT processing.

Per block 516, if a WRITE of the first transaction is received while the PT operation of the second transaction is in progress, each of the tokens of the storage device may be invalidated (e.g., block 414 and/or 418 of FIG. 4). In some embodiments, only the tokens belonging to the second transaction (the token boundaries) may be invalidated such that other transactions corresponding to other tokens may be completed. Accordingly, a storage node may selectively choose not to invalidate any other token associated with the storage device other than those associated with the second transaction. A reporting may also be made to the associated client(s)/host device(s) (e.g., block 415 of FIG. 4). In some embodiments, the invalidating in block 516 may effectively lock or prevent the second transaction (or any other ODX transaction) from writing within any region of the storage device. In some embodiments, the invalidating may lock or prevent the second transaction from writing in any region that will be written to by the first transaction. The invalidation may also cause the second transaction to fail such that the second transaction has to restart. In these situations, a storage node may report the failure and notify the client/host to again initiate a copy/transfer request. However, the invalidation may also be useful because it may cause the storage device to remain consistent, as no other transaction will modify the storage device at the same/substantially the same time.

Per block 513, if a WRITE of the first transaction has not been received during PT processing, then an RRTI command may be received (e.g., by the storage node) in order to retrieve the first token of the first transaction. Per block 514, a WUT command may then be received (e.g., by the storage node) in order to offload write the first token.

Per block 515, it may be determined (e.g., via the storage node) whether a WRITE request of the first transaction is received before (e.g., at a time before or after the RRTI command) or while the WUT command of the second transaction is in progress. Per block 516, if the WRITE of the first transaction is received before/during the WUT processing, each token of the storage device (or each token within the token boundaries) may be invalidated.

Per block 518, if the WRITE of the first transaction is not received before/during the WUT processing, the WUT operation of the second transaction may be completed (i.e., the token corresponding to the first token may be write offloaded). Per block 520, for the second transaction, a second PT command may then be received to generate a second token for region Z of the storage device, which may be within the token boundaries specified in block 508. In some embodiments, the process 500 may continue such that an RRTI command and a WUT command is received for the second token. And a determination may also be made whether the WRITE of the first transaction is received before/while the WUT command for the second token is in progress. Likewise, each and every token of the second transaction may be processed in an identical fashion to the first/second token.

Per block 521, it may be determined whether the WRITE of the first transaction is received during any token processing (other than the first token) for the entire second transaction (i.e., determining whether any other of the second transaction tokens clash with the first transaction WRITE). Per block 525, if the WRITE of the first transaction is received any of the other tokens' processing, then each (or some) of the second transaction's tokens may be invalidated and the second transaction may be failed, which is analogous to block 516. Per block 523, if the WRITE of the first transaction is not received during any of the second transaction's token processing, then the second transaction may be completed. The second transaction may complete when data is transferred from one storage device/sub-unit of the storage device to another (e.g., the data transfer 212 of FIG. 2).

FIG. 6 illustrates an example storage node 110 containing an array of storage devices 04 (e.g., hard-disk drives and/or solid-state drives) according to embodiments. The internal components of the storage node 110 are shown in accordance with the disclosure and may be used to perform selective token clash checking, as described above. As shown, the storage node 110 includes a storage controller 16, one or more switches 02, and one or more storage devices 04, such as hard-disk drives or solid-state drives (e.g., flash-memory-based drives). The storage controller 16 may enable one or more hosts devices (e.g., host devices 102 and/or 104, such as open system and/or mainframe servers) to access data stored in the one or more storage devices 04 via a SAN 22 (e.g., the network 218 of FIG. 2).

As shown in FIG. 6, the storage controller 16 includes one or more servers 06. The storage controller 16 may also include host adapters 08 and device adapters 10 to connect the storage controller 16 to host devices and storage devices 04, respectively. Multiple servers 06*a*, 06*b* may provide redundancy to ensure that data is always available to connected host devices. Thus, when one server 06*a* fails, the other server 06*b* may remain functional to ensure that I/O is able to continue between the hosts and the storage devices 04. This process may be referred to as a "failover."

Particular enterprise storage nodes may have a storage node 110 having an architecture similar to that illustrated in FIG. 6. Particular enterprise storage nodes may include a high-performance, high-capacity storage controller providing disk storage that is designed to support continuous operations. Particular enterprise storage nodes may use servers 06*a*, 06*b*, which may be integrated with a virtualization engine technology. Nevertheless, management techniques according to the disclosure are not limited to any specific enterprise storage node 110, but may be implemented in any comparable or analogous storage node 110 regardless of the manufacturer, product name, or components or component names associated with the storage node 110. Any storage node 110 that could benefit from management techniques according to the disclosure is deemed to fall within the scope of the disclosure. Thus, the enterprise storage node shown is presented only by way of example and is not intended to be limiting.

In selected embodiments, each server 06 includes one or more processors 12 (e.g., n-way symmetric multiprocessors) and memory 14. The memory 14 may include volatile memory (e.g., RAM) as well as non-volatile memory (e.g., ROM, EPROM, EEPROM, hard disks, flash memory, etc.). The volatile memory and non-volatile memory may store software modules that run on the processor(s) 12 and are used to access data in the storage devices 04. The servers 06 may host at least one instance of these software modules. These software modules may manage all read and write requests to logical volumes in the storage devices 04. For example, the memory 14 may include the token clash check need module 20 and the write expectancy module 21. The token clash check need module 20 may be configured to invalidate each token associated with a particular storage device 40 when a token clash check is not needed. Likewise the write expectancy module 21 may be configured to indicate whether a write is/is not expected. The token clash check need module 20/write expectancy module 21 may include a token clash check flag (e.g., the token clash check flag 128/write expectancy flag 143 of FIG. 1) that is set (e.g., by an application or an administrator) to indicate whether or not a token clash check is needed/a write is expected. In some embodiments, the token clash check need module 20/write expectancy module 21 may perform some or all of the block functions as specified in FIG. 4 and/or FIG. 5. In some embodiments the token clash check need module 20 and/or write expectancy module 21 may not necessarily be a module located in the memory 14, but may be implemented in hardware via semiconductor devices, chips, logical gates, circuits, circuit cards, and/or other physical hardware devices in lieu of, or in addition to, a processor-based system.

Figure 7:
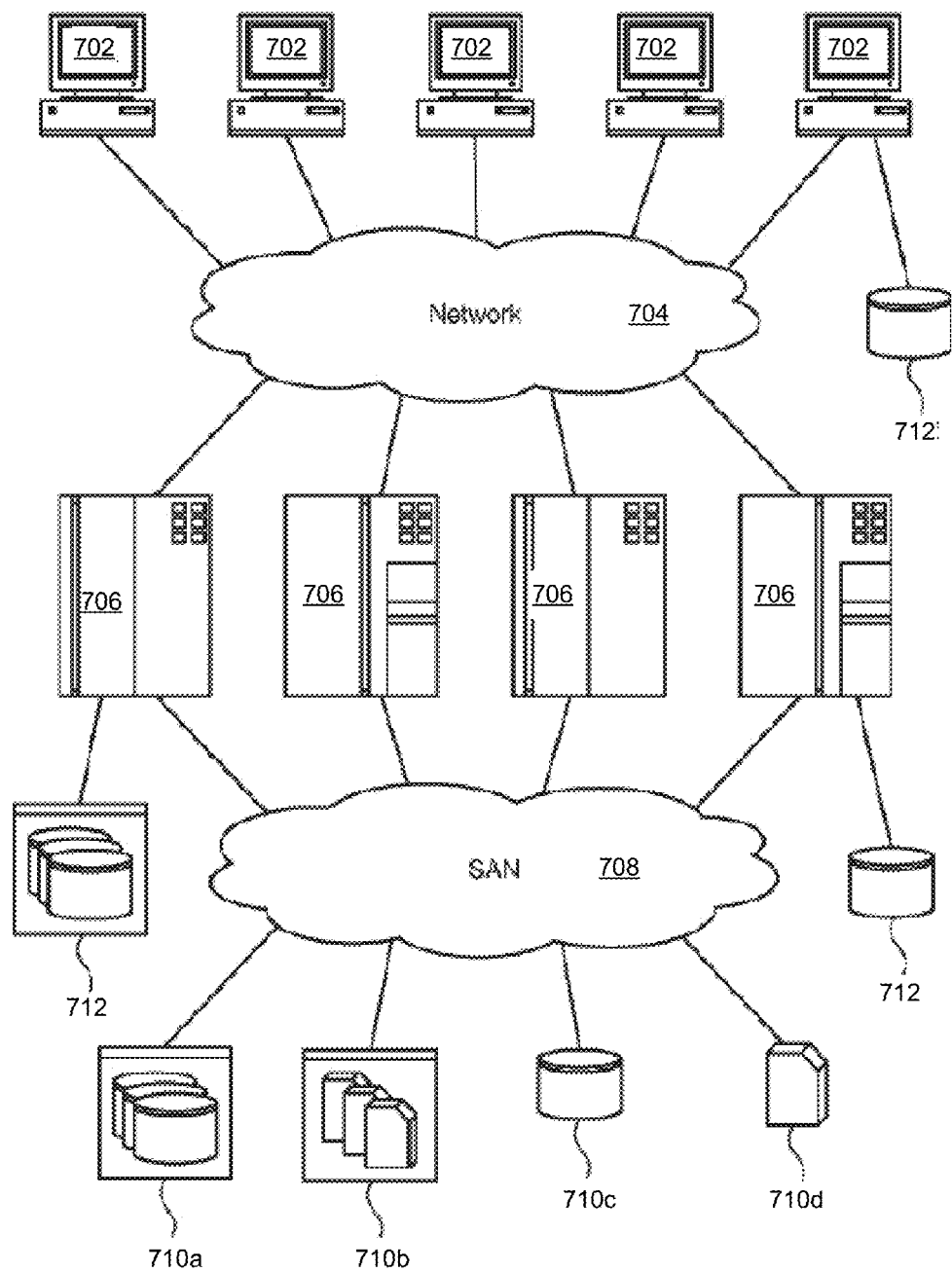
FIG. 7 illustrates an example network architecture, according to embodiments.

FIG. 7 illustrates an example network architecture 700, according to embodiments. In some embodiments, the network architecture 700 is or includes the computing environments 100 and/or 200 of FIG. 1 and FIG. 2. The network architecture 700 is presented to show one example of an environment where a system, method, and computer program product in accordance with the disclosure may be implemented. The network architecture 700 is presented only by way of example and is not intended to be limiting. The system and methods disclosed herein may be applicable to a wide variety of different computers, servers, storage devices, and network architectures, in addition to the network architecture 700 shown.

As shown, the network architecture 700 includes one or more computers 702, 706 interconnected by a network 704 (e.g., the network 108 of FIG. 1). The network 704 may include, for example, a local-area-network (LAN), a wide-area-network (WAN), the Internet, an intranet, or the like. In certain embodiments, the computers 702, 706 may include both client computers 702 and server computers 706 (also referred to herein as "host device"). In some embodiments, the server computers 706 may be the host devices 102, 104, 202, and/or 204 of FIGS. 1 and 2. In general, client computers 702 may initiate communication sessions (i.e., copy/transfer requests), whereas server computers 706 may wait for requests from the client computers 702. In certain embodiments, the computers 702 and/or server computers 706 may connect to one or more internal or external direct-attached storage systems 712 (e.g., arrays of hard-disk drives, solid-state drives, tape drives, etc.). These computers 702, 706 and direct-attached storage systems 712 may communicate using protocols such as ATA, SATA, SCSI, SAS, Fibre Channel, or the like. One or more of the storage systems 712 may contain storage pools that may benefit from management techniques of the disclosure.

The network architecture 700 may, in certain embodiments, include a storage network 708 behind the servers 706, such as a storage-area-network (SAN) or a LAN (e.g., when using network-attached storage). In some embodiments, the storage network 708 is the networks 118 and/or 218 of FIGS. 1 and 2. This network 708 may connect the servers 706 to one or more storage nodes 710 (e.g., the storage nodes 106 and/or 110 of FIGS. 1 and 2), such as arrays 710a of hard-disk drives or solid-state drives, tape libraries 710b, individual hard-disk drives 710c or solid-state drives 710c, tape drives 710d, CD-ROM libraries, or the like. To access a storage system 710, a server computer 706 may communicate over physical connections from one or more ports on the server computer 706 to one or more ports on the storage node 710. A connection may be through a switch, fabric, direct connection, or the like. In certain embodiments, the servers 706 and storage nodes 710 may communicate using a networking standard such as Fibre Channel (FC). One or more of the storage nodes 710 may contain storage pools that may benefit from management techniques according to the disclosure.

Aspects of the present invention may be a system, a method, and/or a computer program product. The computer program product may include a computer readable storage medium (or media) having computer readable program instructions thereon for causing a processor to carry out aspects of the various embodiments.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of embodiments of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of embodiments of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A computer-implemented method for selectively performing token clash checks for data writes, the method comprising:
    receiving, by a first storage node, a first request to write a first set of data to a first storage device of the first storage node, wherein the first storage device is configured to transfer or receive data directly to or from a second storage device without transferring the data to or from a host device mapped to the first storage node;
    determining, by the first storage node, that a first token clash check does not need to occur for the first request, the first token clash check including determining whether the first request is requesting to write to one or more addresses that are associated with one or more tokens owned by a first transaction, the one or more tokens being a proxy for a set of data within one or more particular address ranges of the first storage device;
    receiving, by the first storage node, a second request to write a second set of data to the first storage device of the first storage node;
    determine, based on the first set of data that the write is expected to be received at the first storage node;
    receive, from a second transaction, a third request to write a third set of data to the first storage device of the first storage node;
    determine, based on the second set of data specifying that a virtual machine (VM) migration needs to occur, that a second token clash check needs to occur for the second transaction; and
    perform in response to determining that the second token clash check needs to occur for the second transaction, the second token clash check,
    wherein the second token clash check includes:
        storing a first set of tokens associated with the first transaction in a segment tree, the first set of tokens specifying a first set of logical block address ranges;
        storing a second set of tokens associated with the second transaction in the segment tree, the second set of tokens specifying a second set of logical block address ranges;
        determining whether a portion of the first set of logical block address ranges of first set of tokens matches a portion of the second set of logical block address ranges of the second set of tokens;
        identifying, in response to the portion of the first set of logical block address ranges of the first set of tokens matching the portion of the second set of logical block address ranges, a portion of tokens of the second set of tokens associated with the portion of the second set of logical block address ranges; and
        invalidating the portion of tokens of the second set of tokens, wherein invalidating includes deleting the portion of tokens of the second set of tokens.

2. The method of claim 1, further comprising:
    receiving, by the first storage node, the second request to transfer the second set of data to the to the first storage device, the second request corresponding to transferring the second set of data from the second storage device directly to the first storage device without transferring the second set of data to or from any one or more host devices that are mapped to the first storage node; and
    identifying, upon the receiving of the second request, each token of a plurality of tokens that are associated with the second request.

3. The method of claim 2, further comprising:
determining that the first set of data of the first request corresponds to a same address space as at least a first token of the plurality of tokens of the second request; and
in response to the determining that the first set of data corresponds to the same address space, invalidating each of the plurality of tokens of the second request, wherein the second request is terminated.

4. The method of claim 1, further comprising:
receiving, by the first storage node, the second request to transfer the second set of data to the to the first storage device, the second request corresponding to transferring the second set of data from the second storage device directly to the first storage device without transferring the second set of data to or from any one or more host devices that are mapped to the first storage node; and
invalidating, in response to the receiving of the second request and the determining that a first token clash check does not need to occur for the first request, each token owned by any transaction of the first storage device, wherein the second request is terminated.

5. The method of claim 1, wherein the determining that a first token clash check does not need to occur is based on receiving information from an application associated with the first request, and wherein the application communicates to the first storage node indicating that the first token clash check does not need to occur.

6. The method of claim 1, wherein the determining that a first token clash check does not need to occur is based on receiving a command from an administrator to set a flag, the set of the flag indicating that the first token clash check does not need to occur.

7. The method of claim 1, wherein the determining that a first token clash check does not need to occur is based on determining that the first storage node is associated with a consistency group, the consistency group including a plurality of storage devices, wherein each of the plurality of storage devices include a same set of data.

8. A system comprising:
a first storage node having a processor; and a computer readable storage medium having program instructions embodied therewith, the program instructions readable/executable by the processor to cause the system to perform a method, the method comprising:
receiving a first request to write a first set of data to a first storage device of the first storage node, wherein the first storage device is configured to transfer or receive data directly to or from a second storage device without transferring the data to or from a host device mapped to the first storage node;
determining that a first token clash check does not need to occur for the first request, the first token clash check including determining whether the first request is requesting to write to one or more addresses that are associated with one or more tokens owned by a first transaction, the one or more tokens being a proxy for a set of data within one or more particular address ranges of the first storage device;
receiving, by the first storage node, a second request to write a second set of data to the first storage device of the first storage node;
determine, based on the first set of data that the write is expected to be received at the first storage node;
receive, from a second transaction, a third request to write a third set of data to the first storage device of the first storage node;
determine, based on the second set of data specifying that a virtual machine (VM) migration needs to occur, that a second token clash check needs to occur for the second transaction; and
perform in response to determining that the second token clash check needs to occur for the second transaction, the second token clash check, wherein the second token clash check includes:
storing a first set of tokens associated with the first transaction in a segment tree, the first set of tokens specifying a first set of logical block address ranges;
storing a second set of tokens associated with the second transaction in the segment tree, the second set of tokens specifying a second set of logical block address ranges;
determining whether a portion of the first set of logical block address ranges of first set of tokens matches a portion of the second set of logical block address ranges of the second set of tokens;
identifying, in response to the portion of the first set of logical block address ranges of the first set of tokens matching the portion of the second set of logical block address ranges, a portion of tokens of the second set of tokens associated with the portion of the second set of logical block address ranges; and
invalidating the portion of tokens of the second set of tokens, wherein invalidating includes deleting the portion of tokens of the second set of tokens.

9. The system of claim 8, wherein the method further comprises:
receiving the second request to transfer the second set of data to the first storage device, the second request corresponding to transferring the second set of data from the second storage device directly to the first storage device without transferring the second set of data to or from any one or more host devices that are mapped to the first storage node; and
identifying, upon the receiving of the second request, each token of a plurality of tokens that are associated with the second request.

10. The system of claim 9, wherein the method further comprises:
determining that the first set of data of the first request corresponds to a same address space as at least a first token of the plurality of tokens of the second request; and
in response to the determining that the first set of data corresponds to the same address space, invalidating each of the plurality of tokens of the second request, wherein the second request is terminated.

11. The system of claim 8, wherein the method further comprises:
receiving the second request to transfer the second set of data to the first storage device, the second request corresponding to transferring the second set of data from the second storage device directly to the first storage device without transferring the second set of data to or from any one or more host devices that are mapped to the first storage node; and
invalidating, in response to the receiving of the second request and the determining that a first token clash check does not need to occur for the first request, each token owned by any transaction of the first storage device, wherein the second request is terminated.

12. The system of claim 8, wherein the determining that a first token clash check does not need to occur is based on receiving information from an application associated with the first request, and wherein the application communicates to the first storage node indicating that the first token clash check does not need to occur.

13. A computer program product comprising a computer readable storage medium having program code embodied therewith, the program code executable/readable by a first storage node to:

receive a first set of data indicating whether a write is expected to be received at the first storage node while a first transaction is in progress, the first transaction requesting to transfer data directly to a first storage device of the first storage node from a second storage device without transferring the data to or from a host device mapped to the first storage node;

receive a second set of data indicating whether a first token clash check needs to occur, the first token clash check including determining whether a first request is requesting to write to one or more addresses that are associated with one or more tokens owned by the first transaction, the one or more tokens being a proxy for a set of data within one or more particular address ranges of the first storage device;

determine, based on receiving the first set of data that the write is expected to be received at the first storage node;

receive, from a second transaction, a second request to write a third set of data to the first storage device of the first storage node;

determine, based on the second set of data specifying that a virtual machine (VM) migration needs to occur, that the first token clash check needs to occur for the second transaction; and perform in response to determining that the first token clash check needs to occur for the second transaction, the first token clash check, wherein the first token clash check includes:

storing a first set of tokens associated with the first transaction in a segment tree, the first set of tokens specifying a first set of logical block address ranges;

storing a second set of tokens associated with the second transaction in the segment tree, the second set of tokens specifying a second set of logical block address ranges;

determining whether a portion of the first set of logical block address ranges of first set of tokens matches a portion of the second set of logical block address ranges of the second set of tokens;

identifying, in response to the portion of the first set of logical block address ranges of the first set of tokens matching the portion of the second set of logical block address ranges, a portion of token of the second set of tokens associated with the portion of the second set of logical block address ranges; and invalidating the portion of tokens of the second set of tokens, wherein invalidating includes deleting the portion of tokens of the second set of tokens.

14. The computer program product of claim 13, wherein the program code is further executable/readable by the first storage node to:

determine, based on receiving the first set of data that the write is not expected to be received at the first storage node;

receive, from a second transaction, the second request to write the third set of data to the first storage device of the first storage node;

determine, based on the second set of data specifying that the first device and second device of the first storage node are within a consistency group and include a same set of data, that the first token clash check does not need to occur for the second transaction;

invalidate each token associated with the first storage device and the first transaction; and write the third set of data to the first storage device of the first storage node in response to invalidating each token associated with the first storage device and the first transaction.

15. The computer program product of claim 13, wherein the program code is further executable/readable by the first storage node to:

identify, upon the requesting to transfer of the first transaction, each token of a plurality of tokens that are associated with the first transaction;

determine, based on receiving the first set of data that the write is not expected to be received at the first storage node;

receive, from a second transaction, the second request to write a third set of data to the first storage device of the first storage node;

determine, based on receiving the second set of data, that the first token clash check does not need to occur for the second transaction; and invalidate each token only associated with the first transaction and selectively choosing not to invalidate any other token associated with the first storage device.

16. The computer program product of claim 13, wherein the receiving of the first set of data and the second set of data is based on receiving information from an application associated with the first transaction.

17. The computer program product of claim 13, wherein the receiving of the first or second set of data is based on determining that the first storage node is associated with a consistency group, the consistency group including a plurality of storage devices, wherein each of the plurality of storage devices include a same set of data.

* * * * *